US005811481A

United States Patent [19]
Boutier et al.

[11] Patent Number: 5,811,481
[45] Date of Patent: Sep. 22, 1998

[54] LITHOGRAPHIC INK

[75] Inventors: Robert H. Boutier, Warminster; Bruce K. McEuen, East Whiteland Twp., both of Pa.; Michael F. Heilman, Charleston Twp., Mich.

[73] Assignee: Elf Atochem North America, Inc., Philadelphia, Pa.

[21] Appl. No.: 479,278

[22] Filed: Jun. 7, 1995

[51] Int. Cl.$^6$ .................................................. C08L 91/00
[52] U.S. Cl. ........................ 524/313; 524/379; 524/380; 524/385; 525/327.7
[58] Field of Search .................................. 524/313, 379, 524/380, 385; 525/327.7

[56] References Cited

U.S. PATENT DOCUMENTS

| | | | |
|---|---|---|---|
| 2,454,284 | 11/1948 | Kirk | 525/327.7 |
| 2,570,846 | 10/1951 | Otto | 525/327.7 |
| 2,676,934 | 4/1954 | Butler | 525/327.7 |
| 2,967,162 | 1/1961 | Vasta | 525/327.7 |
| 2,977,334 | 3/1961 | Zopf, Jr. et al. | 525/327.7 |
| 3,218,287 | 11/1965 | Schmidle et al. | 524/313 X |
| 3,388,106 | 6/1968 | Muskat | 525/327.7 |
| 3,412,104 | 11/1968 | McIntosh et al. | 524/313 |
| 3,563,937 | 2/1971 | Nickerson | 525/327.7 |
| 3,811,904 | 5/1974 | Zola | 106/193 J |
| 3,838,087 | 9/1974 | Pirck et al. | 525/327.7 |
| 3,862,067 | 1/1975 | Moiter et al. | 524/313 |
| 3,943,111 | 3/1976 | Fritze et al. | 525/327.7 |
| 4,071,489 | 1/1978 | Emmons et al. | 526/328 X |
| 4,079,102 | 3/1978 | Wagner et al. | 106/20 X |
| 4,170,486 | 10/1979 | Doppler | 706/307 |
| 4,177,177 | 12/1979 | Vanderhoff et al. | 260/29.2 |
| 4,186,116 | 1/1980 | Dhein et al. | 524/313 |
| 4,385,149 | 5/1983 | Tsuchiya et al. | 524/313 |
| 4,391,721 | 7/1983 | Pappas | 252/51.5 |
| 4,536,218 | 8/1985 | Ganho | 524/313 X |
| 4,536,528 | 8/1985 | George, Jr. et al. | 524/313 |
| 4,558,075 | 12/1985 | Suss et al. | 523/216 |
| 4,601,863 | 7/1986 | Shioi et al. | 264/4.3 |
| 4,670,516 | 6/1987 | Sackmann et al. | 525/327.7 |
| 4,963,188 | 10/1990 | Parker | 525/327.7 |
| 5,004,763 | 4/1991 | Imagawa | 524/313 X |
| 5,102,925 | 4/1992 | Suzuki et al. | 524/313 X |
| 5,516,853 | 5/1996 | Schneider et al. | 525/327.7 |

FOREIGN PATENT DOCUMENTS

| | | | |
|---|---|---|---|
| 077594 | 9/1985 | European Pat. Off. | |
| 0256456 | 2/1988 | European Pat. Off. | |
| 0390401 | 10/1990 | European Pat. Off. | |
| 2338642 | 3/1975 | Germany | 525/327.7 |
| XP002028146 | 2/1973 | Japan | |
| 56-62809 | 5/1981 | Japan | |
| 991908 | 5/1965 | United Kingdom | 525/327.7 |

*Primary Examiner*—Judy M. Reddick
*Attorney, Agent, or Firm*—Seidel, Gonda, Lavorgna & Monaco, PC

[57] ABSTRACT

A lithographic printing ink contains an ester-modified carboxyl-containing copolymer as a pigment dispersant. The ester-modified carboxyl-containing copolymer is the reaction product of a long chain alcohol and a styrene maleic anhydride copolymer, wherein at least 35% of the carboxyl groups of the styrene maleic anhydride copolymer are esterified. The ink further includes a solvent selected from the group consisting of aliphatic hydrocarbons, aromatic hydrocarbons, and mixtures thereof; a modifying oil; a liquid carrier resin; and a pigment.

18 Claims, No Drawings

LITHOGRAPHIC INK

FIELD OF THE INVENTION

The present invention is directed to a lithographic printing ink containing an additive that provides improved pigment dispersion, more particularly, to a lithographic printing ink containing an additive that is the product of an esterification reaction of a carboxyl containing copolymer with a long chain alcohol, and a process for preparing the ink.

BACKGROUND OF THE INVENTION

Printing inks are mixtures of coloring agents dispersed or dissolved in a liquid vehicle or carrier, which forms a gel or paste that can be printed on a substrate and dried. Printing inks may, in general, be divided into four classes: 1) letterpress; 2) lithographic; 3) flexographic; and 4) rotogravure. A varnish is a resinous solution that is spread on wood or metal surfaces to provide a hard, lustrous, generally transparent coating for protection.

Lithographic printing inks are used in a number of printing processes, such as offset lithography, in which the image areas of a plate are treated to accept greasy inks and repel water, while the nonimage areas of the plate accept water and repel ink. A lithographic printing ink is preferably soluble in organic solvents and strongly hydrophobic.

Typically, the coloring agents used in inks are pigments, toners, and dyes, or combinations thereof. Coloring agents provide contrast against a substrate background on which the inks are printed. A liquid resin is frequently used as a vehicle or carrier for the coloring agents during printing operations, and, in most cases, serves to bind the coloring agents to the substrate. One of the most important functions of the liquid resin carrier is to promote pigment dispersion.

The traditional practice in the field of lithographic ink formulation has been to combine a linseed oil with an alkyd resin or phenolic resin in order to improve pigment dispersion. Sulfonated castor oil and naphthenic soaps have also been used for this purpose, but to a lesser extent. Past efforts to modify resins in order to enhance pigment dispersion have been unsuccessful. The efforts to modify resins taken to date have resulted in resins that exhibit improved pigment dispersion, but also exhibit reduced hydrophobicity. Accordingly, there is a need for an additive for lithographic printing inks that improves pigment dispersion without adversely affecting the hydrophobicity of the resin carrier.

SUMMARY OF THE INVENTION

The present invention is directed to a lithographic printing ink containing an additive that improves pigment dispersion and a process for preparing the improved lithographic printing ink. The lithographic printing ink composition includes as a dispersant, an ester modified carboxyl containing copolymer. The ester modified carboxyl containing copolymer is a reaction product of a long chain alcohol and a styrene maleic anhydride copolymer, wherein at least about 35% of the carboxyl groups of the styrene maleic anhydride copolymer are esterified to form the reaction product. The ink further includes a solvent selected from the group consisting of aliphatic hydrocarbons, aromatic hydrocarbons, and mixtures thereof, along with a modifying oil, such as those derived from animal oils, vegetable oils, and mixtures thereof. A liquid carrier resin and a pigment are also provided in the printing ink.

In a preferred process for making the improved lithographic printing ink, a styrene maleic anhydride copolymer is reacted with a long chain alcohol to produce a reaction product. At least about 35%, more preferably about 40%, of the carboxyl groups of the styrene maleic anhydride copolymer are esterified to form the reaction product. In a most preferred process, approximately 50% of the carboxyl groups of the styrene maleic anhydride copolymer are esterified to form the reaction product. The reaction product is then combined with a solvent and/or modifying oil to form a relatively thick solution. Liquid resin carrier and pigment are then introduced into the thick solution. The resulting solution is ground and subsequently diluted with additional solvent and/or modifying oil to produce a lithographic printing ink with improved pigment dispersion.

DETAILED DESCRIPTION OF THE INVENTION

The present invention is a lithographic printing ink having an additive wherein the lithographic printing ink exhibits improved pigment dispersion without the loss of hydrophobicity. The improved lithographic printing ink contains an ester modified carboxyl-containing copolymer dispersant, a hydrocarbon solvent and modifying oil solvent, a liquid resin carrier, and various coloring agents or pigments, as dictated by need. One advantage that results from incorporating a dispersant into a lithographic printing ink is that the time required for grinding and dispersing coloring agents is significantly reduced. Additionally, the quantity of pigment that must be incorporated into the resulting lithographic printing ink is also reduced without a loss in the tone, clarity, or depth of the coloring. A dispersant, as used in the present invention, that provides greater tone, depth, and clarity without increasing the viscosity of an ink is a significant advance.

The carboxyl containing copolymer used in the present invention to prepare the dispersant is preferably prepared by polymerizing predetermined proportions of maleic anhydride and styrene monomer to produce styrene maleic anhydride copolymers. The molar ratio of styrene monomer to maleic anhydride is preferably from about 3:1 to about 1:1. More preferably, a molar ratio of approximately 3:1 is used. These substantially amorphous copolymers are commonly available or prepared by well-known polymerization techniques.

The preferred styrene maleic anhydride copolymers contemplated for practicing the present invention are characterized by having a number average molecular weight of less than 2000, relatively high melting temperatures, high thermal stability, and high melt viscosities. Examples of preferred styrene maleic anhydride copolymers, listed in descending order of preference, are SMA 3000, SMA 2000, and SMA 1000, which are commercially available from Elf Atochem North America, Inc., Philadelphia, Pa.

SMA 1000 is a copolymer prepared from a mixture of styrene monomer and maleic anhydride having a molar ratio of approximately 1.3 moles of styrene monomer to approximately 1 mole of maleic anhydride.

SMA 1000 has a melting range from approximately 150° C. to approximately 170° C., a glass transition temperature of approximately 154° C., an acid number of approximately 465 to 495, and a viscosity of approximately 28 centipoise (20% ammoniacal solution at 30° C.).

SMA 2000 is a copolymer prepared from a mixture of styrene monomer and maleic anhydride having a molar ratio of approximately 2 moles of styrene for every mole of maleic anhydride. SMA 2000 has a melting range from approximately 140° C. to approximately 160° C., a glass transition temperature of approximately 124° C., an acid number of approximately 335 to 375, and a viscosity of approximately 136 centipoise (20% ammoniacal solution at 30° C.).

SMA 3000 is a copolymer prepared from a mixture of styrene monomer and maleic anhydride having a molar ratio approximately 3 moles of styrene monomer for every mole of maleic anhydride. SMA 3000 has a melting range from approximately 115° C. to approximately 130° C., a glass transition temperature of approximately 125° C., an acid number of approximately 265 to 305. SMA 3000 is the most preferred copolymer because its esterification product exhibits the highest levels of solubility in hydrocarbon and oil solvents commonly used in formulating lithographic printing inks.

Carboxyl-containing copolymers, such as styrene maleic anhydride copolymer, are substantially amorphous solids which are relatively insoluble in aliphatic hydrocarbons and oils. In order to increase its solubility, the carboxyl containing copolymer is reacted with a long chain alcohol in an esterification reaction. The ester modified carboxyl containing copolymer additive must contain in ester form, a solubility improving amount of a $C_6$ or greater aliphatic alcohol, preferably a $C_{10-22}$ alcohol or mixtures thereof, more preferably a $C_{12-18}$ alcohol, or mixtures thereof. The esterification products of alcohols having less than about six carbon atoms do not exhibit sufficient solubility in aliphatic hydrocarbons or oils for purposes of the present invention. Since the copolymer product of the esterification reaction described below must remain in solution to provide the desired improved pigment dispersion, alcohols have less than six carbon atoms are not preferred reactants in the esterification reaction.

Alcohol compounds which may be reacted with the carboxyl-containing copolymers to form the ester functions include $C_6$ or greater primary, secondary, and tertiary alcohols, including hexanol, isohexanol, 2-ethylhexanol, t-octanol, isooctanol, decanol octadecanol (lauryl alcohol), tetradecyl alcohol, oleyl alcohol, stearyl alcohol. The most preferred alcohols are oleyl alcohol and stearyl alcohol. These alcohols are well known and are commonly made by a variety of processes, including the "oxo" alcohol process or hydroformylation.

A preferred method for producing the ester modified carboxyl-containing copolymer additive for use in the present invention is by reacting a long chain alcohol, most preferably $C_{12}$ to $C_{18}$, with a carboxyl-containing copolymer, such as styrene maleic anhydride copolymer, in a reaction vessel at an elevated temperature. In the making of lithographic printing inks, the ester modified carboxyl-containing copolymer additive is then dissolved in solvent and/or modifying oil. Coloring agents and a liquid carrier resin are then combined with the mixture. The resulting mixture is then ground to produce a pigment dispersion. The pigment dispersion is subsequently diluted with additional solvent and/or modifying oil to produce a lithographic printing ink.

In the esterification reaction, a long chain alcohol is introduced into a reaction vessel maintained by an external heat source at a slightly elevated temperature between 40° C. and 70° C. If the long chain alcohol is amorphous at room temperature, it is allowed to melt prior to introducing any additional components into the reaction vessel. The alcohol component is maintained at the elevated temperature while a carboxyl- containing copolymer, preferably styrene maleic anhydride, is slowly introduced into the reaction vessel. The long chain alcohol component is preferably contacted with between 1.3 and 0.9 molar equivalents, more preferably 1.1 and 0.95 molar equivalents, of the carboxyl-containing copolymer. Preferably, at the conclusion of the esterification reaction, at least approximately 35%, more preferably approximately 50%, of the carboxyl groups on the carboxyl-containing copolymer are esterified to form the reaction product.

As the carboxyl-containing copolymer is introduced into the reaction vessel, the reaction vessel is continuously heated by the external heat source to an elevated temperature between 140° C. and 180° C., more preferably approximately 170° C. The esterification reaction between the long chain alcohol and the carboxyl-containing copolymer proceeds at the elevated temperature. Depending on the purity, concentration, temperature, and other reaction conditions, the esterification reaction may take from 30 minutes to 12 hours, more preferably between 1 to 3 hours. Common esterification catalysts may optionally be used to promote the esterification reaction. Examples of common esterification catalysts include sulfuric acid, sulfonic acid, and lithium acetate. The esterification conditions described above are well known to those skilled in the art. The product of the esterification reaction may be stripped of any volatile materials or excess alcohol at the conclusion of the esterification reaction.

Suitable solvents for use in lithographic printing inks are well known to those skilled in the art. Examples of solvents that may be used in lithographic printing inks are high boiling aliphatic hydrocarbons typically containing greater than 10 carbon atoms, aromatic hydrocarbons, and mixtures thereof. A preferred solvent is an aliphatic hydrocarbon oil, such as a high boiling technical grade white oil containing 14 carbons and higher and having a molecular weight of about 200–250. One such available solvent is Magic 470 Oil, available from Magie Brothers. Examples of modifying oils are vegetable oils, animal oils, and mixtures thereof. A preferred modifying oil is linseed oil. Liquid carrier resins are well known to those skilled in the art. Examples of suitable liquid resin carriers are alkyd resins or phenolic resins.

Pigments are incorporated into a lithographic ink in order to provide contrast against a substrate on which the ink is placed. Examples of pigments that may be provided in a lithographic printing ink are titanium dioxide, carbon black, zinc oxide, lead titanate, potassium titanate, antimony oxide, lithopone, phthalocyanine blue, quinacridone, ferric hydrates, and the like. The tone, depth, and clarity of the color contrast increases as the amount of pigment incorporated into the lithographic ink is increased. Similarly, the viscosity of a lithographic printing ink increases as the amount of pigment is increased. At a certain point, the viscosity of a lithographic printing ink may be too high to be commercially feasible, which effectively limits the amount of pigment that may be provided in a lithographic ink.

In order to prepare a lithographic printing ink having improved pigment dispersion, a predetermined quantity of the ester modified copolymer dispersant is combined with a predetermined quantity of a hydrocarbon solvent and modifying oil. The ester modified copolymer dispersant is initially preferably combined with a modifying oil to form a solution wherein the weight fraction of the ester modified copolymer dispersant is from approximately 10% to approximately 50%, more preferably approximately 30%. Solutions having greater than approximately 50% by weight of the ester modified copolymer dispersant are difficult to fully dissolve. The ester modified copolymer dispersant and modifying oil solution is then combined with additional modifying oil, solvent, coloring agents and liquid resin carriers. The resulting mixture is ground to produce a pigment dispersion and subsequently diluted with additional solvent and/or modifying oil to produce a lithographic printing ink with improved pigment dispersion.

The weight ratio of modifying oil to pigment in the pigment dispersion is preferably in the range of approximately 2:1 to 0.5:1, more preferably approximately 1:1. The weight ratio of pigment to additive in the pigment dispersion is preferably in the range of approximately 300:1 to 50:1, more preferably from 200:1 to 75:1, most preferably approximately 100:1.

Pigment dispersions are commonly diluted or adjusted by end users with liquid resins, solvents, and/or modifying oils in order to produce a lithographic printing ink having a desired viscosity. The desired viscosity of any particular lithographic printing ink is dependent on the characteristics of the printing equipment and printing substrate.

A well established practice for determining the uniformity and fineness of pigment dispersion in an ink formulation is ASTM D-1210-79 entitled Standard Test for Fineness of Dispersion of Pigment-Vehicle Systems. This test method measures the degree of dispersion of a pigment in a pigment-vehicle system. An ink having a uniform dispersion of fine particles typically has a reading on the Hegman scale of approximately 6.5 to 7.5. An ink having a poorly dispersed mixture of particles typically has a reading on the Hegman scale in the vicinity of 1 or 2. Most commercial lithographic inks should have a reading on the Hegman scale above 6.5.

Preparative Examples 1 and 2 illustrate a preferred procedure for preparing the ester modified carboxyl containing copolymer, which acts as a dispersant in the present invention. Examples 3 through 10 illustrate preferred procedures for preparing the present invention in which the dispersants have been made in similar, but not necessarily identical fashion, to the procedures described in Preparative Examples 1 and 2.

Examples 3 through 6 illustrate the formulation of pigment dispersions with a variety of preferred dispersants in which the pigment was carbon black. Examples 7 through 10 illustrate the formulation of pigment dispersions with a variety of preferred dispersants in which the pigment was titanium dioxide. Comparative Examples 1 and 2 illustrate the formulation of pigment dispersions not having dispersants provided therein in which the pigments are carbon black and titanium dioxide, respectively.

In accordance with the procedures outlined in ASTM-D-1210-79, the pigment dispersion formulations described below were spread by means of a scraper along a calibrated tapered path. A Hegman scale, numbered from 1 to 8, was provided along the length of the tapered path.

As the printing ink formulations were spread along the tapered path, particles in the ink formed a discernable pattern. A direct reading from the Hegman scale was then made at the point where the particles formed the discernable pattern. The results of the observations are tabulated below in Table I, entitled Carbon Black Coloring Agent, and Table II, entitled Titanium Dioxide Coloring Agent.

PREPARATIVE EXAMPLE 1

1044 grams of liquid oleyl alcohol (melting point −7.5° C., boiling point 195° C. at 8 torr) was weighed into a 5 liter reaction vessel. The reaction vessel was heated using an external heat source to approximately 170° C. while the alcohol contained in the vessel was continuously stirred. 956 grams of SMA 1000 was slowly introduced into the reaction vessel using a powder funnel while maintaining the reaction vessel at 170° C. The reaction vessel was continuously maintained at 170° C. for 2 hours at which time the external heat source was removed. The reactor vessel was disassembled and, using insulated gloves, the molten mixture was poured onto an aluminum foil covered tray to cool to form an ester modified copolymer product.

PREPARATIVE EXAMPLE 2

1048 grams of solid crystal stearyl alcohol (melting point 59° C., boiling point 210° C. at 15 torr) was weighed into a 5 liter reaction vessel. The reaction vessel was slowly heated using an external heat source to 60° C. to melt the stearyl alcohol in the reaction vessel. 952 grams of SMA 1000 was then slowly introduced into the reaction vessel using a powder funnel while maintaining the reaction vessel at 60° C. The reaction vessel was then heated to and maintained at approximately 170° C. for 2 hours. After the external heat source was removed, the reactor vessel was disassembled and, using insulated gloves, the molten mixture was poured onto an aluminum foil covered tray to cool to form an ester modified copolymer product.

EXAMPLE 3

1.17 grams of a 30% by weight solution of an esterification product of SMA 1000 and oleyl alcohol in boiled linseed oil were combined with 50 grams of boiled linseed oil. 50 grams of linseed alkyd resin, 35 grams of Raven 1200, a carbon black coloring agent, and 100 grams of ceramic beads were then introduced into the mixture to form a pigment dispersion designated hereinafter as 178-2. Pigment dispersion 178-2 was ground in known fashion and periodically subjected to a Hegman Grind analysis according to ASTM D-1210-79.

EXAMPLE 4

1.17 grams of a 30% weight solution of an esterification product of SMA 3000 and oleyl alcohol in boiled linseed oil were combined with 50 grams of boiled linseed oil. 50 grams of linseed alkyd resin, 35 grams of Raven 1200, a carbon black coloring agent, and 100 grams of ceramic beads were then introduced into the mixture to form a pigment dispersion designated hereinafter as 178-3. Pigment dispersion 178-3 was ground in known fashion and periodically subjected to a Hegman grind analysis according to ASTM D-1210-79.

EXAMPLE 5

1.17 grams of a 30% weight solution of an esterification product of SMA 1000 and stearyl alcohol were combined with 50 grams of boiled linseed oil. 50 grams of linseed alkyd resin, 35 grams of Raven 1200, a carbon black coloring agent, and 100 grams of ceramic beads were then introduced into the mixture to form a pigment dispersion designated hereinafter as 178-4. Pigment dispersion 178-4 was ground in known fashion and periodically subjected to a Hegman grind analysis according to ASTM D-1210-79.

EXAMPLE 6

1.17 grams of a 30% weight solution of an esterification product of SMA 3000 and stearyl alcohol were combined with 50 grams of boiled linseed oil. 50 grams of linseed alkyd resin, 35 grams of Raven 1200, a carbon black coloring agent, and 100 grams of ceramic beads were then introduced into the mixture to form a pigment dispersion designated hereinafter as 178-5. Pigment dispersion 178-5 was ground in known fashion and periodically subjected to a Hegman grind analysis according to ASTM D-1210-79.

COMPARATIVE EXAMPLE 1

50 grams of boiled linseed oil, 50 grams of linseed alkyd resin, 35 grams of Raven 1200, a carbon black coloring agent, and 100 grams of ceramic beads were combined in a vessel to form a pigment dispersion designated hereinafter as Control-1. Pigment dispersion Control-1 was ground in known fashion and periodically subjected to a Hegman Grind analysis according to ASTM D-1210-79.

EXAMPLE 7

1.67 grams of a 30% weight solution of an esterification product of SMA 1000 and oleyl alcohol were combined with 25 grams of boiled linseed oil. 25 grams of Soya alkyd resin 157A, and 50 grams of TiPure R960-48HG, a titanium dioxide coloring agent, were then introduced into the mixture to form a pigment dispersion designated hereinafter as 170-2. Pigment dispersion 170-2 was ground in known fashion and periodically subjected to a Hegman Grind analysis according to ASTM D-1210-79.

EXAMPLE 8

1.67 grams of a 30% weight solution of an esterification product of SMA 3000 and oleyl alcohol were combined with 25 grams of boiled linseed oil. 25 grams of Soya alkyd resin 157A, and 50 grams of TiPure R960-48HG, a titanium dioxide coloring agent, were then introduced into the mixture to form a pigment dispersion designated hereinafter as 170-3. Pigment dispersion 170-3 was ground in known fashion and periodically subjected to a Hegman Grind analysis according to ASTM D-1210-79.

EXAMPLE 9

1.67 grams of a 30% weight solution of an esterification product of SMA 1000 and stearyl alcohol were combined with 25 grams of boiled linseed oil. 25 grams of Soya alkyd resin 157A, 50 grams of TiPure R960-48HG, a titanium dioxide coloring agent, were then introduced into the mixture to form a pigment dispersion designated hereinafter as 170-4. Pigment dispersion 170-4 was ground in known fashion and periodically subjected to a Hegman Grind analysis according to ASTM D-1210-79.

EXAMPLE 10

1.67 grams of a 30% weight solution of an esterification product of SMA 3000 and stearyl alcohol were combined with 25 grams of boiled linseed oil. 25 grams of Soya alkyd resin 157A, 50 grams of TiPure R960-48HG, a titanium dioxide coloring agent, were then introduced into the mixture to form a pigment dispersion designated hereinafter as 170-5. Pigment dispersion 170-5 was ground in known fashion and periodically subjected to a Hegman Grind analysis according to ASTM D-1210-79.

COMPARATIVE EXAMPLE 2

25 grams of boiled linseed oil, 25 grams of Soya alkyd resin 157A, and 50 grams of TiPure R960-48HG, a titanium dioxide coloring agent, were combined in a vessel to form a pigment dispersion designated hereinafter as Control-2. Pigment dispersion Control-2 was ground in known fashion and periodically subjected to a Hegman Grind analysis according to ASTM D-1210-79.

TABLE I

CARBON BLACK COLORING AGENT

| Pigment dispersion | Hegman Units | Time (min.) |
| --- | --- | --- |
| 178-2 (Example 3) | — 6.3 | 5 |
| 178-3 (Example 4) | — 5.5 | 5 |
| 178-4 (Example 5) | — 6.3 | 5 |
| 178-5 (Example 6) | — 8.0 | 5 |
| Control-1 (Comparative 1) | — 3.0 | 5 |
| 178-2 (Example 3) | — 8.0 | 10 |
| 178-3 (Example 4) | — 8.0 | 10 |
| 178-4 (Example 5) | — 8.0 | 10 |
| 178-5 (Example 6) | — 8.0 | 10 |
| Control-1 (Comparative 1) | — 3.5 | 10 |
| 178-2 (Example 3) | — 8.0 | 15 |
| 178-3 (Example 4) | — Not measured[1] | 15 |
| 178-4 (Example 5) | — Not measured | 15 |
| 178-5 (Example 6) | — Not measured | 15 |
| Control-1 (Comparative 1) | — 4.5 | 15 |
| 178-2 (Example 3) | — Not measured | 20 |
| 178-3 (Example 4) | — Not measured | 20 |
| 178-4 (Example 5) | — Not measured | 20 |
| 178-5 (Example 6) | — Not measured | 20 |
| Control-1 (Comparative 1) | — 6.5 | 20 |
| 178-2 (Example 3) | — Not measured | 25 |
| 178-3 (Example 4) | — Not measured | 25 |
| 178-4 (Example 5) | — Not measured | 25 |
| 178-5 (Example 6) | — Not measured | 25 |
| Control-1 (Comparative 1) | — 6.8 | 25 |

[1]The pigment dispersions were no longer measured once the readings on the Hegman scale approached 8.0.

TABLE II

TITANIUM DIOXIDE COLORING AGENT

| Pigment dispersion | Hegman Units | Time (min.) |
| --- | --- | --- |
| 170-2 (Example 7) | — 7.4 | 5 |
| 170-3 (Example 8) | — 6.5 | 5 |
| 170-4 (Example 9) | — 6.4 | 5 |
| 170-5 (Example 10) | — 8.0 | 5 |
| Control-2 (Comparative 2) | — 3.6 | 5 |
| 170-2 (Example 7) | — 7.6 | 10 |
| 170-3 (Example 8) | — 7.4 | 10 |
| 170-4 (Example 9) | — 7.3 | 10 |
| 170-5 (Example 10) | — Not Measured[2] | 10 |
| Control-2 (Comparative 2) | — 3.6 | 10 |
| 170-2 (Example 7) | — Not Measured | 15 |
| 170-3 (Example 8) | — Not measured | 15 |
| 170-4 (Example 9) | — Not measured | 15 |
| 170-5 (Example 10) | — Not measured | 15 |
| Control-2 (Comparative 2) | — 6.4 | 15 |
| 170-2 (Example 7) | — Not measured | 20 |
| 170-3 (Example 8) | — Not measured | 20 |
| 170-4 (Example 9) | — Not measured | 20 |
| 170-5 (Example 10) | — Not measured | 20 |
| Control-2 (Comparative 2) | — 7.2 | 20 |
| 170-2 (Example 7) | — Not measured | 25 |
| 170-3 (Example 8) | — Not measured | 25 |
| 170-4 (Example 9) | — Not measured | 25 |
| 170-5 (Example 10) | — Not measured | 25 |
| Control-2 (Comparative 2) | — 7.5 | 25 |

[2]The pigment dispersion samples were no longer measured once the readings on the Hegman scale reached approximately 8.0.

The present invention may be embodied in other specific forms without departing from the spirit or essential attributes thereof and, accordingly, reference should be made to the appended claims, rather than to the foregoing specification, as indicating the scope of the invention.

We claim:

1. A lithographic printing ink composition comprising:
   a) as a dispersant, at least one ester-modified carboxyl-containing copolymer being a reaction product of a long chain alcohol containing from 6 to 22 carbon atoms and a styrene maleic anhydride copolymer, wherein at least 35 % of the carboxyl groups of the styrene maleic anhydride copolymer are esterified to form the reaction product;
   b) a solvent selected from the group consisting of aliphatic hydrocarbons, aromatic hydrocarbons, and mixtures thereof;
   c) a modifying oil selected from the group consisting of animal oils, vegetable oils and mixtures thereof;
   d) a liquid carrier resin selected from the group consisting of alkyd resins, phenolic resins, and mixtures thereof; and
   e) at least one pigment.

2. A lithographic printing ink as defined in claim 1 wherein the long chain alcohol is a straight or branched $C_{10-22}$ monohydric alcohol.

3. A lithographic printing ink as defined in claim 1 wherein the long chain alcohol is a straight or branched $C_{12-18}$ monohydric alcohol.

4. A lithographic printing ink as defined in claim 1 wherein the long chain alcohol is selected from the group consisting of oleyl alcohol, stearyl alcohol, and mixtures thereof.

5. A lithographic printing ink as defined in claim 4 wherein the modifying oil is a linseed oil.

6. A lithographic printing ink as defined in claim 1 wherein at least approximately 40% of the carboxyl groups of the styrene maleic anhydride are esterified to form the ester-modified carboxyl-containing copolymer.

7. A lithographic printing ink as defined in claim 1 wherein the weight ratio of pigment to ester-modified carboxyl-containing copolymer is from approximately 300:1 to approximately 50:1.

8. A lithographic printing ink as defined in claim 1 wherein the weight ratio of pigment to ester-modified carboxyl-containing copolymer is from approximately 200:1 to approximately 75:1.

9. A lithographic printing ink as defined in claim 8 wherein the weight ratio of pigment to ester-modified carboxyl-containing copolymer is approximately 100:1.

10. A process for making an improved lithographic printing ink comprising:
    a) reacting a styrene maleic anhydride copolymer with a long chain alcohol containing from 6 to 22 carbon atoms to produce an ester-modified carboxyl-containing copolymer, wherein at least 35% of the carboxyl groups of the styrene maleic anhydride copolymer are esterified to form the ester-modified carboxyl-containing copolymer;
    b) combining the ester-modified carboxyl-containing copolymer with a solvent selected from the group consisting of aliphatic hydrocarbons, aromatic hydrocarbons, and mixtures thereof and a modifying oil selected from the group consisting of animal oils, vegetable oils, and mixtures thereof to form a solution;
    c) combining the solution from step (b) with a liquid carrier resin selected from the group consisting of alkyd resins, phenolic resins, and mixtures thereof, and at least one pigment.

11. A process as defined in claim 10 wherein the long chain alcohol is a straight or branched $C_{10-22}$ monohydric alcohol.

12. A process as defined in claim 11 wherein the long chain alcohol is a straight or branched $C_{12-18}$ monohydric alcohol.

13. A process as defined in claim 10 wherein the long chain alcohol is selected from the group consisting of oleyl alcohol, stearyl alcohol, and mixtures thereof.

14. A process as defined in claim 13 wherein the modifying oil is linseed oil.

15. A process as defined in claim 14 wherein approximately 50% of the carboxyl groups of the styrene maleic anhydride copolymer are esterified to form the ester-modified carboxyl-containing copolymer.

16. A process as defined in claim 10 wherein the weight ratio of pigment to ester-modified carboxyl-containing copolymer is approximately 300:1 to approximately 50:1.

17. A process as defined in claim 16 wherein the weight ratio of pigment to ester-modified carboxyl-containing copolymer is from approximately 200:1 to approximately 75:1.

18. A process as defined in claim 7 wherein the weight ratio of pigment to ester-modified carboxyl-containing copolymer is approximately 100:1.

* * * * *